United States Patent
Ohtomo et al.

(10) Patent No.: US 6,435,283 B1
(45) Date of Patent: Aug. 20, 2002

(54) ROTARY LASER IRRADIATING APPARATUS AND CONSTRUCTION MACHINE CONTROL SYSTEM

(75) Inventors: Fumio Ohtomo; Kunihiro Hayashi, both of Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/927,002

(22) Filed: Aug. 9, 2001

Related U.S. Application Data

(62) Division of application No. 09/320,331, filed on May 26, 1999.

(30) Foreign Application Priority Data

Jun. 17, 1998 (JP) ............................................ 10-186946

(51) Int. Cl.⁷ .................................................. E02F 3/76
(52) U.S. Cl. .................... 172/4.5; 356/4.08; 356/139.01
(58) Field of Search ............................. 172/2, 4, 4.5, 5, 172/828; 37/348, 382; 33/1 CC; 701/50; 356/4.08, 141.1, 139.01, 139.07, 147

(56) References Cited

U.S. PATENT DOCUMENTS

| | | | |
|---|---|---|---|
| 4,273,196 A | 6/1981 | Etsusaki et al. | ............. 172/4.5 |
| 4,537,259 A | 8/1985 | Funabashi et al. | ........... 172/4.5 |
| 4,677,555 A * | 6/1987 | Goyet | |
| 4,818,107 A * | 4/1989 | Ono et al. | |
| 5,477,459 A * | 12/1995 | Clegg et al. | |
| 5,771,978 A | 6/1998 | Davidson et al. | ............. 172/4.5 |
| 5,848,485 A | 12/1998 | Anderson et al. | .............. 37/348 |
| 5,926,305 A | 7/1999 | Ohtomo et al. | .............. 359/196 |
| 5,935,183 A | 8/1999 | Sahm et al. | .................... 701/50 |
| 6,016,616 A | 1/2000 | Geelhoed | ...................... 37/348 |
| 6,029,752 A | 2/2000 | Young | ......................... 172/4.5 |
| 6,047,227 A | 4/2000 | Henderson et al. | ........... 701/50 |
| 6,052,181 A * | 4/2000 | Maynard et al. | |
| 6,068,060 A | 5/2000 | Ohtomo et al. | .............. 172/4.5 |
| 6,075,586 A | 6/2000 | Ohtomo et al. | ............ 356/4.08 |
| 6,112,145 A * | 8/2000 | Zachman | |
| 6,189,626 B1 * | 2/2001 | Hanseder | |
| 6,286,607 B1 * | 9/2001 | Ohtomo et al. | |
| 2001/0023766 A1 * | 9/2001 | Ohtomo et al. | |

FOREIGN PATENT DOCUMENTS

| | | | | |
|---|---|---|---|---|
| DE | 1815445 | * | 8/1969 | ................. 172/4.5 |
| JP | 230437 | * | 11/1985 | ................. 172/4.5 |

OTHER PUBLICATIONS

Stedebaker, The Laserplane System, Agricultural Engineering, Aug. 1971, pp. 418 & 419.*

* cited by examiner

Primary Examiner—Victor Batson
(74) Attorney, Agent, or Firm—Nields & Lemack

(57) ABSTRACT

The present invention provides a rotary laser irradiating apparatus, which comprises a laser source, a rotator for forming a laser reference plane by rotary irradiation of a laser beam from the laser source, scanning gear for deflecting the laser beam from the laser source, and a controller for controlling the scanning gear, whereby a plurality of laser reference planes are formed within a predetermined range as desired during one turn of rotary irradiation of the laser beam, and different levels can be set at a plurality of points.

8 Claims, 7 Drawing Sheets

ROTARY LASER IRRADIATING APPARATUS AND CONSTRUCTION MACHINE CONTROL SYSTEM

This application is a divisional of U.S. application Ser. No. 09/320,331, filed May 26, 1999.

BACKGROUND OF THE INVENTION

The present invention relates to a rotary laser irradiating apparatus for forming a reference plane in civil engineering work such as ground leveling and a construction machine control system when construction machine is operated for civil engineering work. In particular, the invention relates to a construction machine control system utilizing a laser reference plane, which is formed by rotary irradiation of a laser beam in the work such as control of ground surface height in ground leveling operation.

When ground leveling operation is performed such as grounding leveling for housing development or for road paving using construction machines such as graders, bulldozers, etc., it is necessary to have a reference for height of the ground leveling. In recent years, a system using a laser beam has been propagated to determine the height, which serves as a reference in ground leveling operation. As a system using the laser beam, a construction machine control system equipped with a rotary laser irradiating apparatus has been proposed.

FIG. 8 shows a case where this construction machine control system is adopted for bulldozers.

In FIG. 8, reference numeral 1 represents a rotary laser irradiating apparatus, and 2 represents a bulldozer. The rotary laser irradiating apparatus 1 is installed via a tripod 3 at a predetermined position in a housing development area. The rotary laser irradiating apparatus 1 irradiates a laser beam 4 in a horizontal direction and also rotates the laser beam, and a reference plane is formed by the laser beam 4.

The bulldozer 2 has a blade 5, which is supported in such manner that it can be moved up or down. A pole 6 is erected on the blade 5, and a level sensor 7 is mounted on the pole 6. The level sensor 7 receives the laser beam 4 coming from the rotary laser irradiating apparatus 1 and detects a photo-detecting position. The bulldozer 2 comprises a control unit (not shown), which detects height of the blade 5 based on a receiving signal from the level sensor 7 and controls height of the blade 5 based on the result of detection.

As described above, the horizontal reference plane is formed by the laser beam, and ground surface can be leveled in the horizontal direction by maintaining the distance from the horizontal reference plane to a blade edge 5' of the blade 5 at a constant value. By changing the distance to the blade edge 5', the height of the ground surface to be leveled can be changed.

At a construction site of relatively small scale, construction work may be carried out by a single construction machine, while it is generally practiced to use many construction machines at the same time at construction site. Further, the height of the ground surface to be leveled is usually different in each individual case when many construction machines are used for the construction. This means that a rotary laser irradiating apparatus is needed, which can set the levels for many construction machines at the same time. If a plurality of rotary laser irradiating apparatuses is used, erroneous operation of the construction machines may occur in receiving the laser beam.

In order to control a plurality of construction machines at the same time without causing erroneous operation, it is desirable to perform level setting by a single rotary laser irradiating apparatus. To perform level setting to each of the construction machines by a single rotary laser irradiating apparatus, it is necessary to perform level setting to each of the construction machines within one rotation of the laser beam. Conventionally, laser beam is irradiated by rotary irradiation from an optical head, which is rotated at several hundreds of rpm in the rotary laser irradiating apparatus, and a reference plane or a reference line is formed. Therefore, a tilting mechanism is provided to tilt the optical head for level setting and tilt setting.

However, by the tilting mechanism, it is not possible to perform vertical adjustment at high speed as required in the level setting in two or more directions within one rotation of the laser beam, and a construction machine control system for controlling ground leveling operation with a plurality of construction machines by a single rotary laser irradiating apparatus is not yet developed for practical application.

Further, ground leveling operation is not only to level the ground to a horizontal surface, but an inclined ground surface may be prepared in many cases. In housing development construction, it is necessary to prepare ground surface with such gradient as to be convenient for water drainage. In road paving construction, it is necessary to prepare ground surface with the gradient to match topographical feature and with the gradient suitable for water drainage. In the conventional type construction machine control system, ground surface is leveled at first, and inclined surface with a predetermined gradient is prepared according to the result of survey operation.

Although operators without special skill may be able to prepare a horizontal ground surface by the construction machine control system as described above, it is very difficult to prepare ground surface with gradient, and this requires skilled operator. Good finishing condition of the ground leveling in case of the inclined ground surface depends much upon the skill of the operator. The progress of the work varies according to the skill and the experience of the operator, and there are also problems of finishing and process control.

SUMMARY OF THE INVENTION

It is an object of the present invention to provide a system, by which level setting can be performed within a plurality of ranges during one rotation of the laser beam by a single rotary laser irradiating apparatus. It is another object of the invention to provide a system to control a plurality of construction machines by a single rotary laser irradiating apparatus. It is still another object of the invention to provide a system to perform ground leveling operation including preparation of inclined ground surface in easy and efficient manner and without being influenced by skill and experience of the operator.

The rotary laser irradiating apparatus according to the present invention comprises a laser source, a rotator for forming a laser reference plane by rotary irradiation of laser beam from the laser source, scanning means for deflecting the laser beam from the laser source, and control means for controlling the scanning means. Further, the present invention provides the rotary laser irradiating apparatus as described above, wherein there is further provided an encoder for detecting an irradiating direction of the rotator, and the control means controls the scanning means in such manner that the laser reference plane is formed at a predetermined position in a predetermined direction. Also, in the rotary laser irradiating apparatus of the present invention, the scanning means is provided on the rotator. The present invention provides the rotary laser irradiating apparatus as described above, wherein the system comprises an encoder for detecting an irradiating direction of the rotator, scanning means provided on an optical path between the laser source and the rotator and used for deflecting the laser beam, an image rotator provided on an optical path between the scanning means and the rotator and used for rotating the laser beam, and control means for controlling the scanning means in such manner that the laser reference plane is formed at a predetermined position in a predetermined direction, and the image rotator is integrally moved so that it is rotated by ½ turn of the rotator. Also, the present invention provides the rotary laser irradiating apparatus as described above, wherein there is provided a relay lens having a focal point on the rotator and the scanning means on an optical path between the image rotator and the rotator. Further, in the rotary laser irradiating apparatus of the present invention, the laser source is turned off in a predetermined direction based on the detection from the encoder. The present invention also provides a construction machine control system, which comprises a construction machine, a rotary laser irradiating apparatus for changeably forming a laser reference plane for position control of a ground leveling equipment of the construction machine, a GPS receiver for detecting a position of the construction machine, an equipment control means arranged on the construction machine and used for detecting the laser reference plane for controlling the position of the ground leveling equipment, and an arithmetic means for controlling the rotary laser irradiating apparatus in such manner that a laser reference plane corresponding to the position of the construction machine is formed based on detection result of the GPS receiver, and the system controls ground leveling operation of the construction machine. Also, the present invention provides the construction machine control system as described above, wherein the system comprises a GPS receiver provided on the construction machine, transmitting means for transmitting a result of receiving from the GPS receiver, a rotary laser irradiating apparatus for forming a laser reference plane corresponding to the position of the construction machine during one turn of rotation, a level sensor provided on the construction machine and for detecting the laser reference plane, equipment control means for controlling the position of the ground leveling equipment based on the detection result of the level sensor, receiving means for receiving transmission from the transmitting means, and an arithmetic means comprising a storage unit in which working data, topographical data, etc. are stored, for calculating a position of the construction machine based on information obtained from the receiving means, and controlling a laser beam irradiating direction from the rotary laser irradiating apparatus based on information stored in the storage unit. Further, in the construction machine control system of the present invention, the system comprises a GPS receiver provided on the construction machine, transmitting means for transmitting a result of receiving from the GPS receiver, a rotary laser irradiating apparatus for forming a laser reference plane corresponding to the position of the construction machine by using a plurality of laser rotation by on-off control of the laser beam, a level sensor provided on the construction machine and for detecting the laser reference plane, equipment control means for controlling the position of the ground leveling equipment based on the detection result of the level sensor, receiving means for receiving transmission from the transmitting means, and an arithmetic means comprising a storage unit in which work- ing data, topographical data, etc. are stored, for calculating a position of the construction machine from information obtained from the receiving means, and controlling a laser beam irradiating direction from the rotary laser irradiating apparatus according to information stored in the storage unit. Also, the present invention provides the construction machine control system as described above, wherein the GPS receiver comprises a first GPS receiver and a second GPS receiver, the GPS receiver is provided on a construction machine and the second GPS receiver is positioned at a known point. Further, the present invention provides the construction machine control system as described above, wherein there is a plurality of construction machines.

DETAILED DESCRIPTION OF THE PREFERRED EMBODIMENTS

In the following, description will be given on embodiments of the present invention referring to the attached drawings.

First, description will be given on a rotary laser irradiating apparatus, by which it is possible to control a plurality of construction machines.

Figure 1:
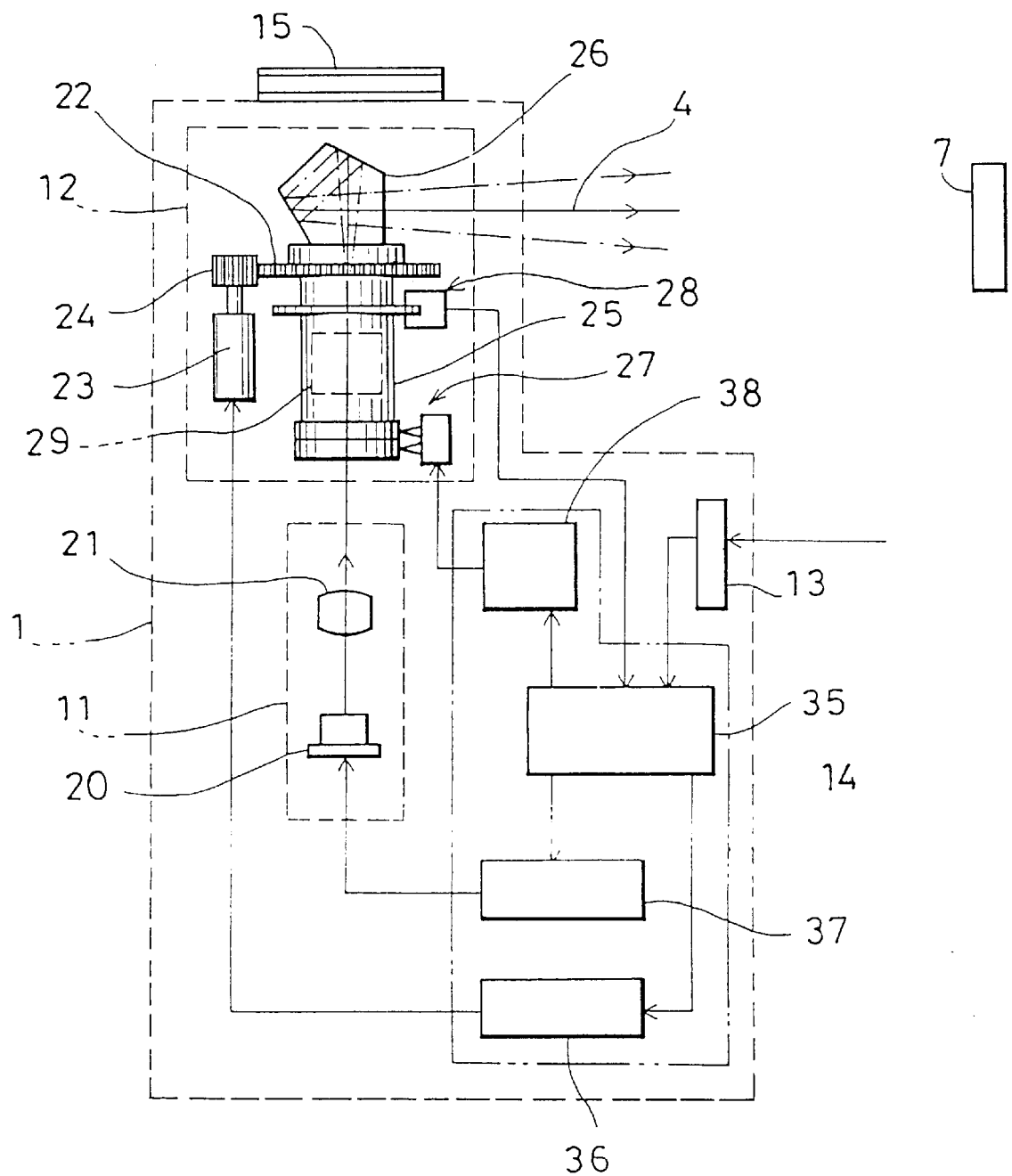
FIG. 1 is a block diagram of an essential part of a first embodiment of a rotary laser irradiating apparatus according to the present invention.

FIG. 1 shows an essential part of a rotary laser irradiating apparatus 1. The rotary irradiating system 1 comprises a light emitter 11 for emitting a laser beam 4, a rotator 12 for irradiating the laser beam 4 within a reference plane by rotary irradiation, a photodetection unit 13 for detecting a reflection light reflected from a level sensor 7, and a control unit 14. On the top surface of the rotary laser irradiating apparatus 1, a collimator 15 is provided. By this collimator 15, a direction of the rotary laser irradiating apparatus 1 can be roughly adjusted with respect to the level sensor 7. Although not shown in the figure, a tilting mechanism 16 (FIG. 7) for tilting an irradiating direction of the laser beam 4 is arranged, and the tilting mechanism 16 is controlled by the control unit 14 described above.

The light emitter 11 comprises a laser diode 20 and a collimator lens 21 and irradiates the laser beam 4 emitted from the laser diode 20 toward the rotator 12 by turning the beam to parallel beams.

Above the collimator lens 21, the rotator 12 is rotatably arranged. On the rotator 12, a scanning gear 22 is mounted, and the scanning gear 22 is engaged with a driving gear 24 of a scanning motor 23, which is fixed on a frame (not shown) of the rotary laser irradiating apparatus 1. When the driving gear 24 is driven, the rotator 12 is rotated.

The scanning gear 22 is fixed on a rotating cylinder 25, which is rotatably supported. On the upper surface of the rotating cylinder 25, a pentagonal prism 26 is mounted, and a slip ring 27 is disposed on the lower end of the rotating cylinder 25. At a predetermined position on the rotating cylinder 25, an encoder 28 to detect an irradiating direction of the laser beam 4 is arranged. Inside the rotating cylinder 25, a scanning means 29 is provided on an optical axis of the emitter 11.

Being emitted from the light emitter 11, the laser beam 4 passes through the scanning means 29 and enters the pentagonal prism 26. An optical axis of the laser beam 4 is deflected at an angle of 90° by the pentagonal prism 26, and the laser beam 4 is rotated in such manner that a laser plane is formed. A rotating position of the rotating cylinder 25 is detected by the encoder 28 mounted on the rotating cylinder 25, and a detection signal from the encoder 28 is inputted to the control unit 14.

As the scanning means 29, the following means may be used, for example: a mechanically tilted mirror, an acousto-optic element utilizing acousto-optic effect, an electro-optic element utilizing electro-optic effect, a magneto-optic element utilizing magneto-optic effect, etc. In general, the acousto-optic element is used in most cases.

Brief description will be given now on the acousto-optic element referring to FIG. 2.

Figure 2:
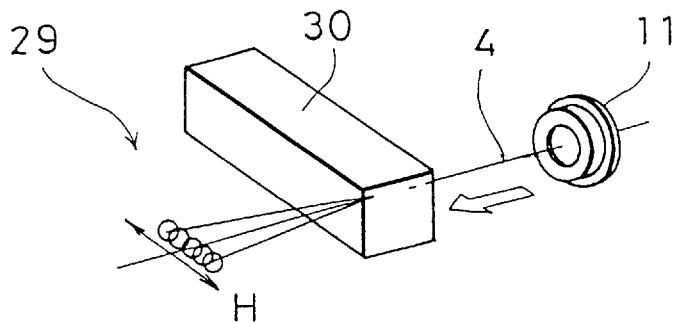
FIG. 2 is a schematical drawing of a scanning means based on an acousto-optical element used in the first embodiment of the present invention.

In FIG. 2, reference numeral 30 represents an acousto-optic element. The acousto-optic element 30 is an element, which diffracts and deflects light as ultrasonic vibration is induced. An ultrasonic generating source (not shown) is integrally fixed on the acousto-optic element 30, and frequency corresponding to the deflection is inputted to the ultrasonic generating source, and an incident light is deflected. Because the acousto-optic element 30 can be operated at frequency of several tens of kHz, it can provide full response to the rotation of the laser beam rotated at several hundreds of rpm. Driving voltage is applied on the acousto-optic element 30 via the slip ring 27.

The control unit 14 comprises an arithmetic unit 35, a scanning motor driving unit 36, a light-emitting element driving unit 37, and a scanning means driving unit 38. The arithmetic unit 35 controls the scanning motor driving unit 36 and drives the scanning motor 23. Further, the arithmetic unit 35 controls the light-emitting element driving unit 37 to emit light from the laser diode 20. Further, it controls the scanning means driving unit 38 and drives the scanning means 29 via the slip ring 27.

Now, description will be given on operation.

The laser diode 20 is driven by the light-emitting element driving unit 37, and the laser beam 4 emitted from the laser diode 20 is projected to the pentagonal prism 26 via the scanning means 29. The laser beam 4 is deflected at an angle of 90° by the pentagonal prism 26 and is projected in a horizontal direction. The scanning motor 23 is driven by the scanning motor driving unit 36, and the pentagonal prism 26 is rotated via the driving gear 24 and the scanning gear 22. By the rotation of the pentagonal prism 26, the laser beam 4 is rotated in a horizontal direction by rotary scanning, and a reference plane is formed.

Based on the rotating position detected by the encoder 28, the scanning means driving unit 38 drives the scanning means 29 via the slip ring 27, and the laser beam 4 is deflected within a plane, which includes the laser beam (in the left-right direction within the paper surface in FIG. 1). When the scanning means 29 deflects the laser beam 4, the laser beam 4 projected by the pentagonal prism 26 is irradiated to scan in a vertical direction. Regarding the scanning rate in the vertical direction, the acousto-optic element 30 can be operated at a frequency of several tens of kHz with respect to the rotation of the laser beam 4 rotated at several hundreds of rpm as described above. Thus, during rotation of the laser beam 4 in the horizontal direction, it can be deflected to the vertical direction at any position desired.

Figure 3:
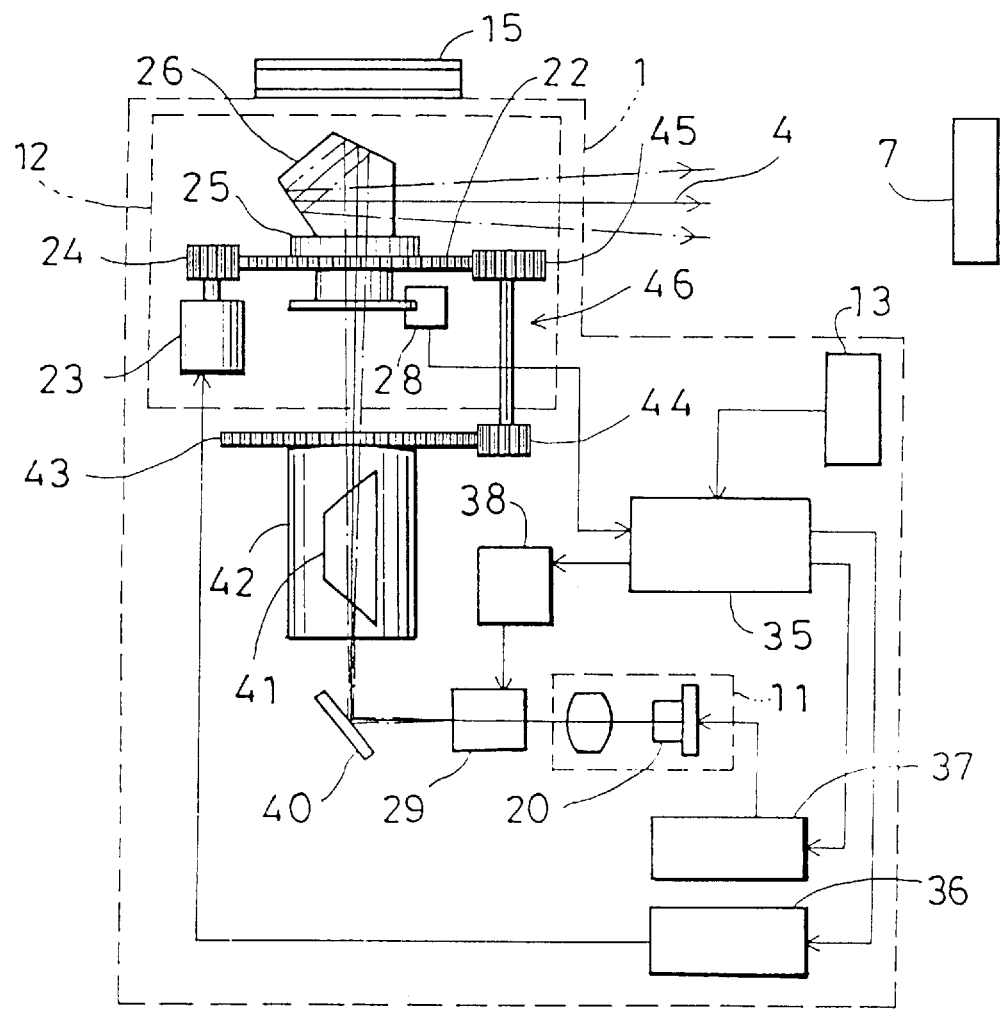
FIG. 3 is a block diagram of an essential part of a second embodiment of the rotary laser irradiating apparatus of the present invention.
Figure 4:
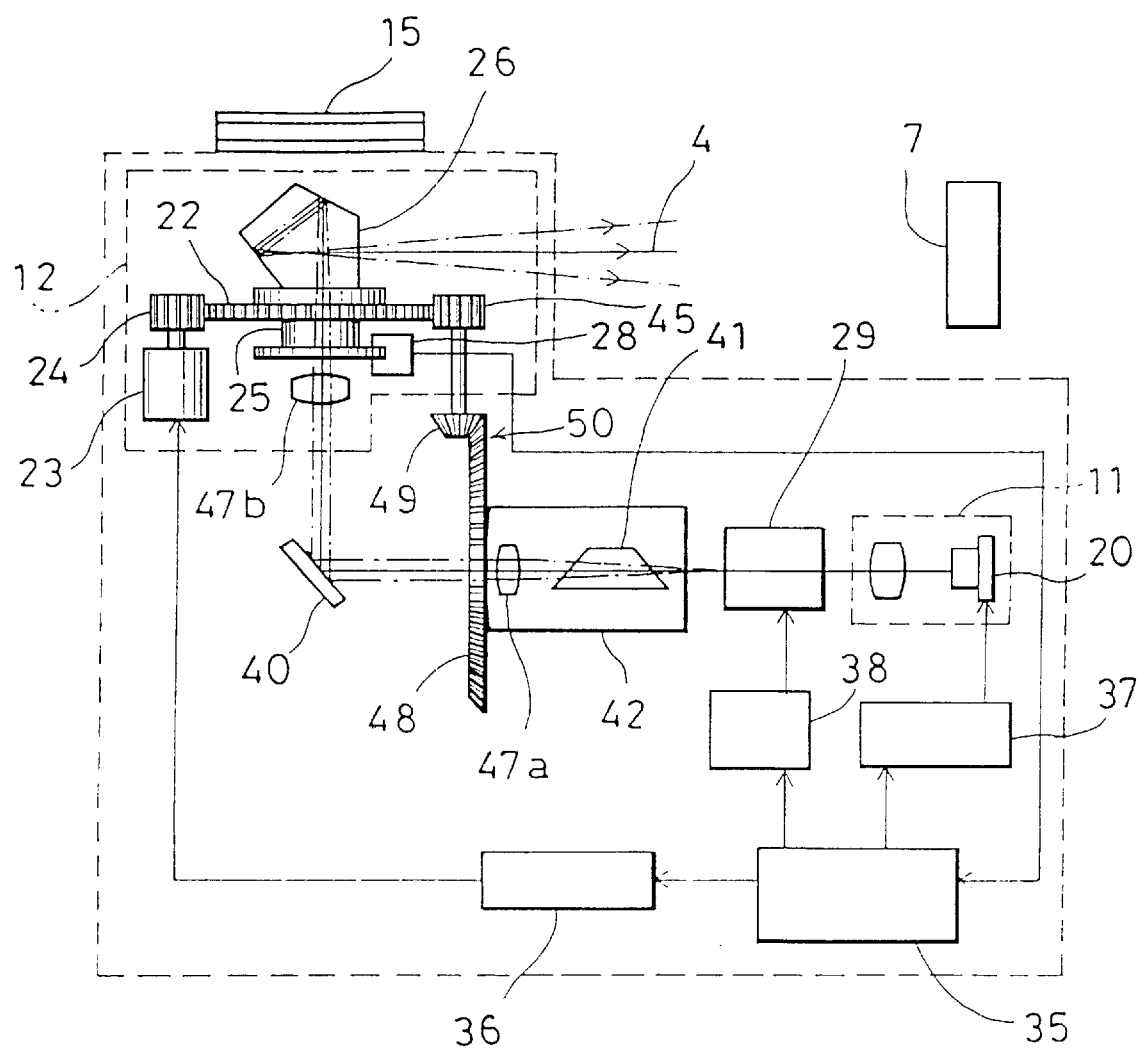
FIG. 4 is a block diagram of an essential part of a third embodiment of the rotary irradiating system of the present invention.

Referring to FIG. 3, description will be given on the rotary laser irradiating apparatus 1 of a second embodiment of the invention. In FIG. 3, the same component as in FIG. 1 is referred by the same symbol, and detailed description is not given here.

In this rotary laser irradiating apparatus 1, the scanning means 29 is disposed on the side of a frame (not shown) of the rotary laser irradiating apparatus 1, and the slip ring 27 is not used.

The light emitter 11 is arranged along a horizontal optical axis, and the scanning means 29 is disposed on the optical axis. A mirror 40 is arranged on the exit side of the scanning means 29, and the laser beam 4 projected from the scanning means 29 is reflected upward in a vertical direction by the mirror 40. On the optical axis of the laser beam 4 reflected by the mirror 40, an image rotator prism 41 is arranged. The image rotator prism 41 is designed in such manner that the image is rotated by two turns when this prism is rotated by one turn.

The image rotator prism 41 is held by a prism holder 42 which is rotatably supported. A synchronizing gear 43 is provided on the prism holder 42, and an idle gear 44 is engaged with the synchronizing gear 43. An idle gear 45 is engaged with the scanning gear 22, and the idle gear 45 and the idle gear 44 are coaxially fixed. By the scanning gear 22, the idle gear 45, the idle gear 44, and the synchronizing gear 43, a gear train 46 is formed so that a revolving ratio between the scanning gear 22 and the synchronizing gear 43 will have a reduction ratio of 2:1.

The laser beam 4 emitted from the laser diode 20 is deflected by the scanning means 29, e.g. it is deflected in the vertical direction within the paper surface in FIG. 3. As described above, the scanning gear 22 and the synchronizing gear 43 are synchronously rotated at a rotation ratio of 2:1 by the gear train 46. Also, as described above, the image rotator prism 41 rotates the image by two turns when the prism is rotated by one turn. Therefore, the optical axis of the beam entering the pentagonal prism 26 is rotated at a ratio of 1:1 in synchronization with the rotation of the pentagonal prism 26. Regardless of the direction of the pentagonal prism 26, the laser beam 4 irradiated by the pentagonal prism 26 is deflected in a vertical direction.

Now, description will be given on the rotary laser irradiating apparatus 1 of a third embodiment of the present invention.

In this third embodiment, a relay lens 47 is provided.

A light emitter 11 is arranged with an optical axis running in a horizontal direction, and the scanning means 29 is disposed on the optical axis of the light emitter 11. A prism holder 42 is rotatably mounted around the optical axis, and an image rotator prism 41 and a relay lens 47a are arranged on the prism holder 42. A reflection mirror 40 is arranged on the side of the prism holder 42 opposite to the scanning means 29, and a relay lens 47b is disposed at a position opposite to the relay lens 47a with the reflection mirror 40 between them.

It is arranged in such manner that the relay lens 47a has its focal point at the scanning center of the scanning means 29 and that the relay lens 47b has its focal point at the rotating center near the exit plane of the pentagonal prism 26. By the relay lenses 47a and 47b, the same effect as in the case of the arrangement of the scanning means near the pentagonal prism 26 can be obtained. In case the distance between the scanning means and the pentagonal prism is long, scanning width is widened depending upon the distance, and a considerably large pentagonal prism is required.

A synchronizing bevel gear 48 is arranged on the side of the prism holder 42 closer to the pentagonal prism, and a scanning gear 22 is provided on the rotating cylinder 25. An idle gear 45 is engaged with the scanning gear 22, and an idle bevel gear 49 is engaged with the synchronizing bevel gear 48. The idle gear 45 and the idle bevel gear 49 are coaxially fixed. By the scanning gear 22, the idle gear 45, the idle bevel gear 49, and the synchronizing bevel gear 48, a gear train 50 is formed so that a revolving ratio between the scanning gear 22 and the synchronizing bevel gear 48 will have a reduction ratio of 2:1.

Figure 5:
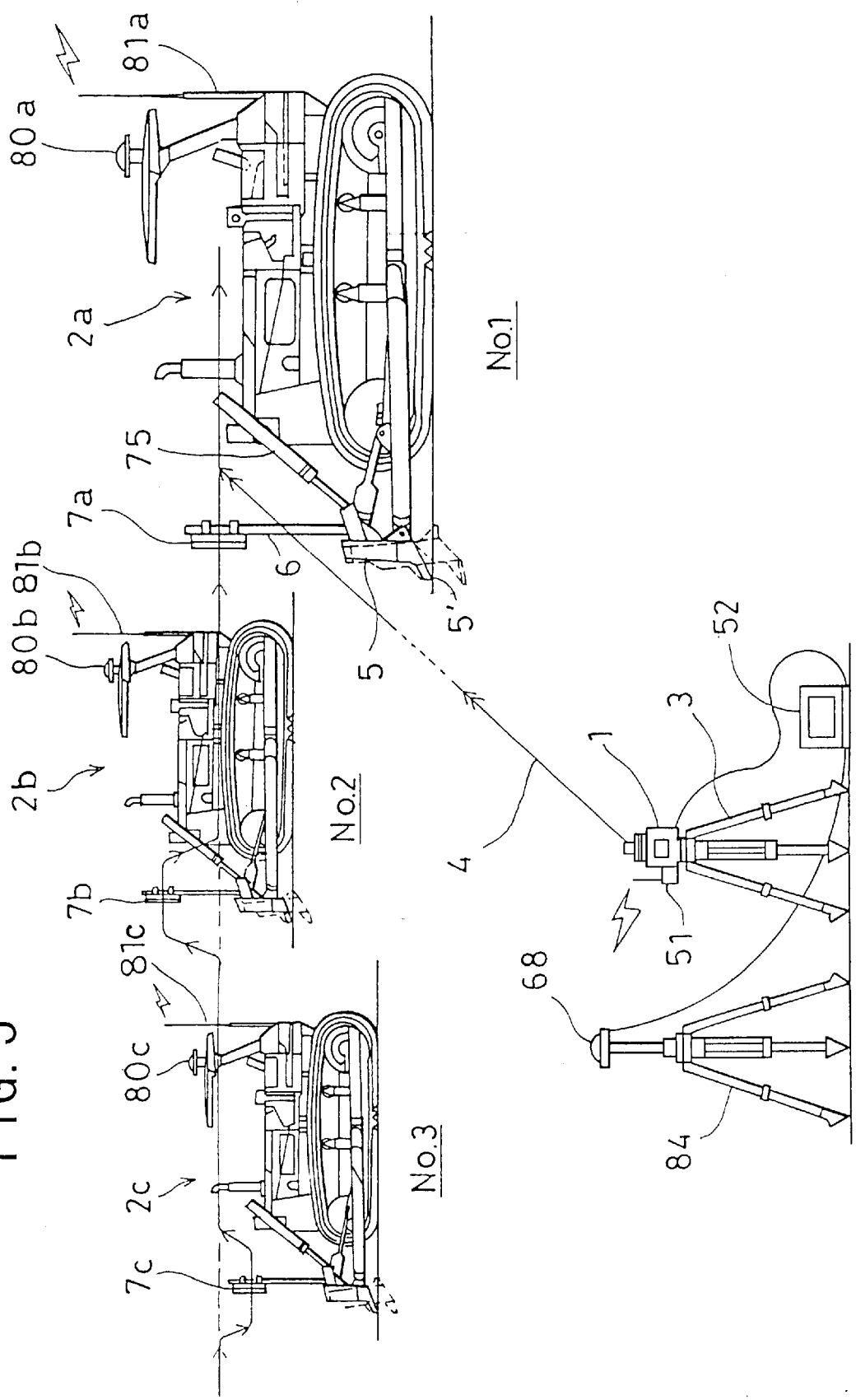
FIG. 5 represents embodiments of a construction machine control system according to the present invention.
Figure 8:
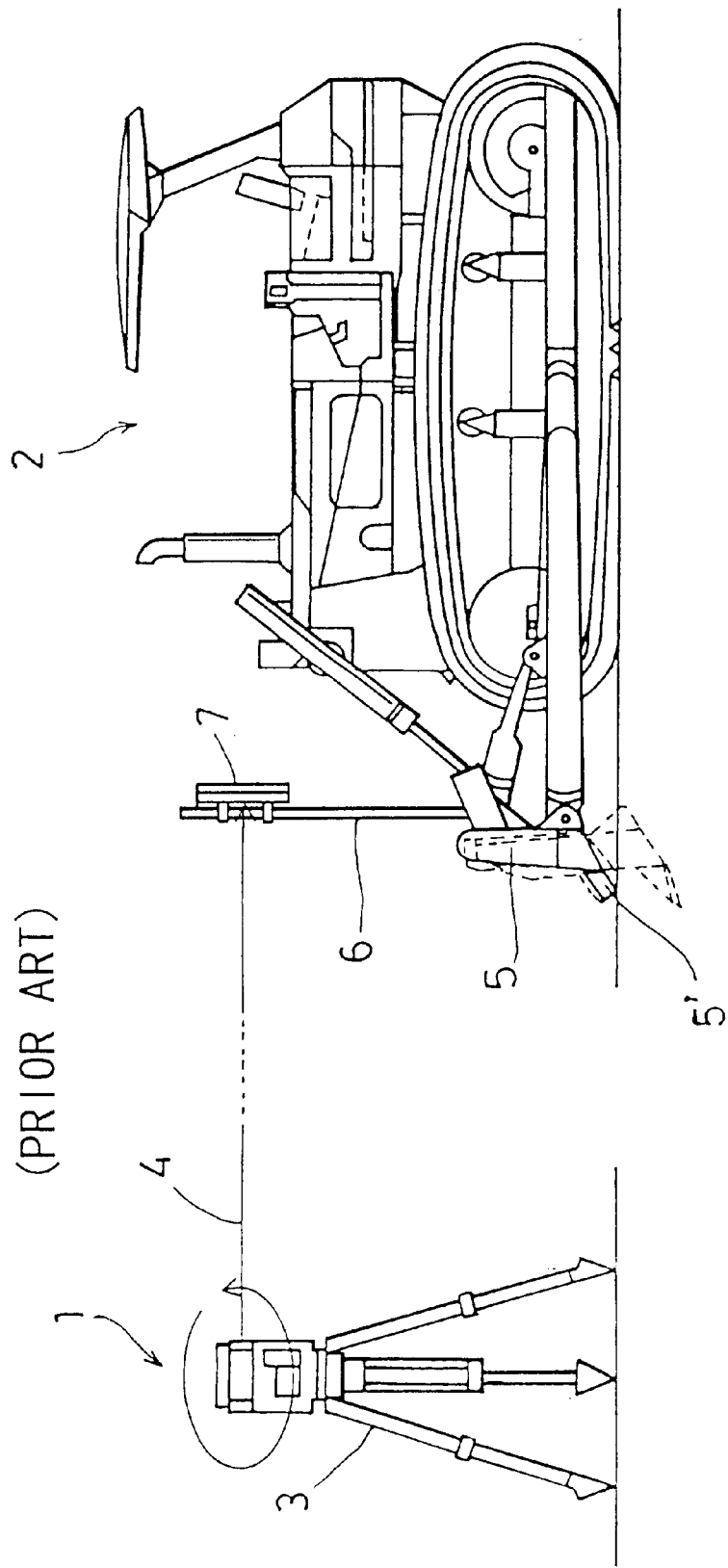
FIG. 8 is a schematical drawing of a conventional type construction machine control system.

In the third embodiment, just as in the second embodiment described above, the optical axis of the laser beam 4 entering the pentagonal prism 26 is rotated in synchronization with the rotation of the pentagonal prism 26, and regardless of the direction of the pentagonal prism 26, the laser beam 4 projected from the pentagonal prism 26 is deflected in a vertical direction. Next, description will be given on a construction machine control system using the rotary laser irradiating apparatus 1 as described above, referring to FIG. 5 and FIG. 6. In FIG. 5, the same component as in FIG. 8 is referred by the same symbol.

The construction machine control system according to the present invention controls a plurality of construction machines, e.g. bulldozers, utilizing the rotary laser irradiating apparatus 1 as described above, which can form a tilted reference plane combined with a global positioning system (GPS).

The construction machine control system comprises the rotary laser irradiating apparatus 1, a radio receiver 51 disposed on the rotary laser irradiating apparatus 1, a plurality of bulldozers 2a, 2b and 2c, level sensors 7a, 7b and 7c mounted on the bulldozers 2a, 2b and 2c, first GPS receivers 80a, 80b and 80c, transmitters 81a, 81b and 81c, and further, a control unit 52, a second GPS receiver 68, etc.

Figure 6:
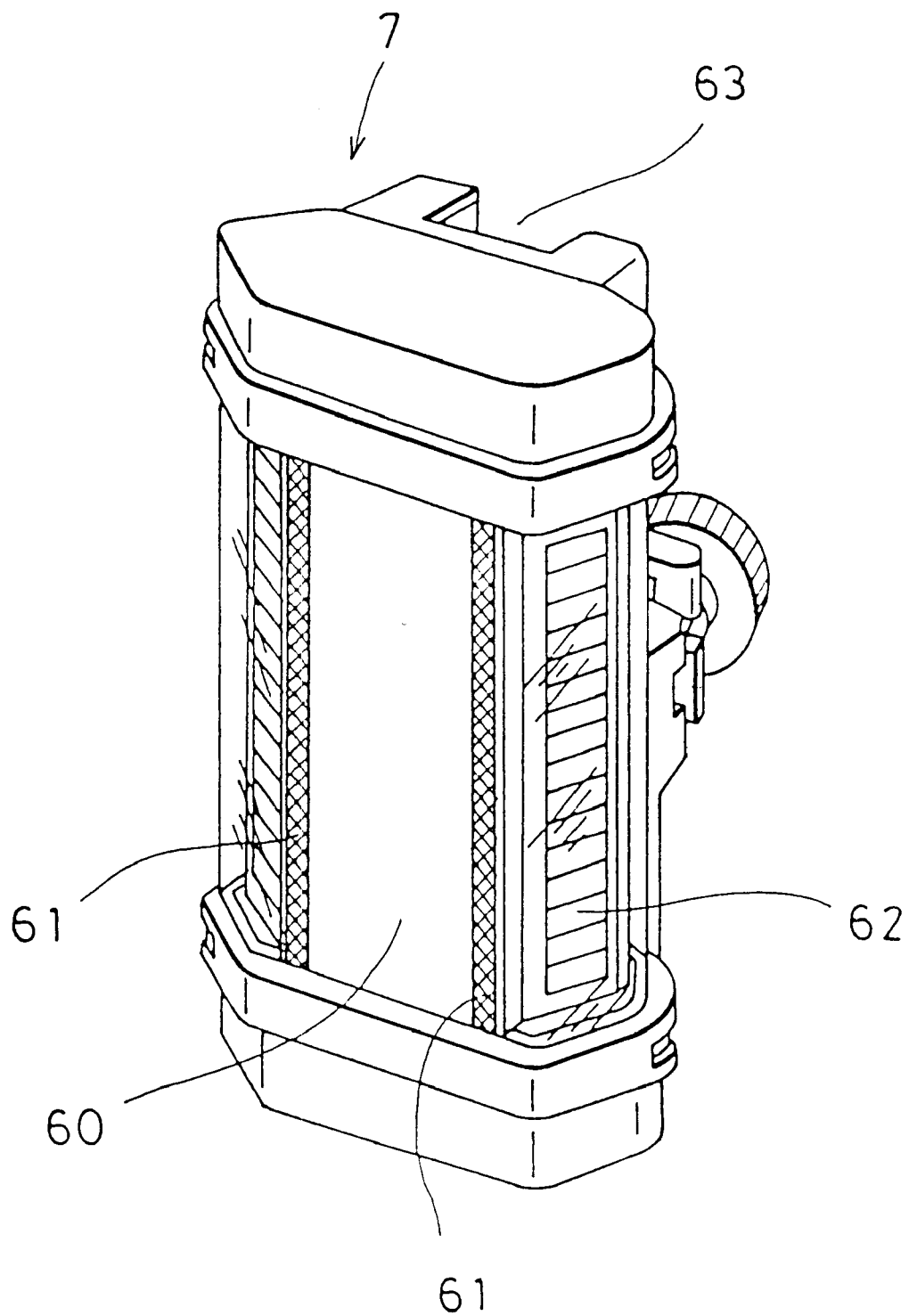
FIG. 6 is a perspective view of a level sensor used in the present invention.

Now, description will be given on the level sensors 7a, 7b and 7c referring to FIG. 6. (In the figure, the level sensor is referred by the reference numeral 7.)

On each of left and right sides of a non-reflection sector 60, a band-like reflection sector 61 is disposed. On the outer side of each of the reflection sectors 61, a photodetection element 62 designed in band-like shape and extending in a vertical direction is arranged, and the photodetection element 62 is disposed at an angle with respect to the reflection sector 61. On the rear side, a groove 63 to be engaged with the pole 6 is formed, and the level sensor 7 is mounted with the pole 6 engaged in the groove 63.

Figure 7:
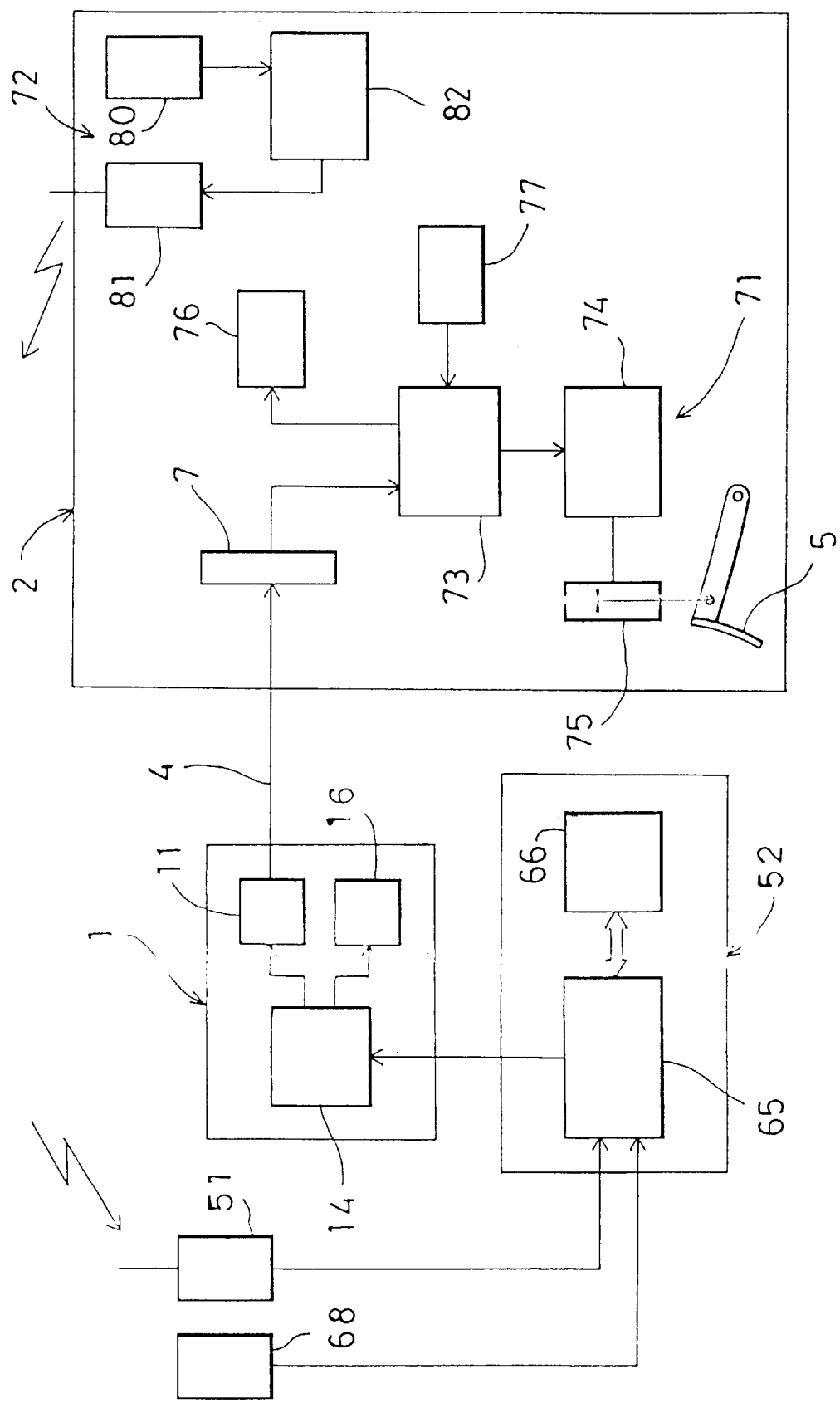
FIG. 7 is a block diagram of an embodiment of the construction machine control system.

The control unit 52 will be described now referring to FIG. 7. In FIG. 7, each of the bulldozers 2a, 2b and 2c is referred as a bulldozer 2, and relevant arrangement and components are referred with reference symbols without suffix or subscript.

The control unit 52 is represented by a personal computer and it comprises an arithmetic unit 65 and a storage unit 66. In the storage unit 66, programs necessary for arithmetic processing are set and inputted. Also, topographical data based on working drawing, i.e. data for ground height with respect to plane coordinates, and further, programs for calculating positions of the bulldozers 2a, 2b and 2c are set and inputted. In addition, machine height of the rotary laser irradiating apparatus 1, distance from a blade edge 5' to the reference position of the level sensor 7, etc. are set and inputted.

A receiving signal from the second GPS receiver 68 as described later is inputted to the control unit 52, and a receiving signal from the radio receiver 51 as described later is also inputted, and positions of the bulldozers 2a, 2b and 2c can be calculated from the receiving signals according to the arithmetic programs. Further, from the calculation results and the topographical data based on the working drawing as preset in the storage unit 66, a tilt angle of the laser beam 4 emitted from the rotary laser irradiating apparatus 1 is calculated in relation with the bulldozers 2a, 2b and 2c. Then, based on the calculation results, a command is issued to the control unit 14 of the rotary laser irradiating apparatus 1.

Each of the bulldozers 2 comprises a blade driving unit 71 for controlling a position of the blade 5 and a radio transmitter/receiver 72.

First, the blade driving unit 71 will be described.

The level sensor 7 is mounted on the pole 6, and the distance between the blade edge 5' of the blade 5 and the reference position of the level sensor 7 is a value already known. A detection signal of the laser beam 4 by the level sensor 7 is inputted to an arithmetic unit 73, and the arithmetic unit 73 calculates the height of the blade edge 5'. The arithmetic unit 73 drives a hydraulic cylinder 75 via an electric/hydraulic circuit 74, moves the blade 5 up or down and determines the position of the blade 5. The electric/hydraulic circuit 74 comprises an electromagnetic valve. The arithmetic unit 73 issues an open/close control command to the electric/hydraulic circuit 74 in accordance with a predetermined sequence. By opening or closing of the electromagnetic valve by the electric/hydraulic circuit 74, pressure fluid is supplied to the hydraulic cylinder 75 or discharged from the hydraulic cylinder 75, or flow rate are adjusted, and the hydraulic cylinder 75 is moved up or down in a predetermined direction at a predetermined rate. A display unit 76 is connected to the arithmetic unit 73, and the position of the blade 5 or excavating condition achieved by the blade 5 is displayed.

Reference numeral 77 represents an operation unit, and direct manual operation can be performed according to the display on the display unit 76. Positioning of the blade can be achieved manually while watching the display on the display unit 76. A signal from the operation unit 77 is inputted to the arithmetic unit 73, and the arithmetic unit 73 drives the hydraulic cylinder 75 via the electric/hydraulic circuit 74 according to the input signal.

Next, the radio transmitter/receiver 72 will be described.

At a position where there is almost no obstacle to interrupt electric wave from satellites, e.g. on the roof of the bulldozer 2, the first GPS receiver 80 is mounted. Information received by the first GPS receiver 80 is processed by necessary signal processing such as amplification by a signal processor 82, and it is transmitted from the transmitter 81 to the radio receiver 51.

As shown in FIG. 5, the second GPS receiver 68 is installed via a tripod 84 at a position, which serves as a reference point and is located near the rotary laser irradiating apparatus 1. Receiving a result of the second GPS receiver 68 and receiving a result of the radio receiver 51 are inputted to the control unit 52. By the first GPS receiver 80 and the second GPS receiver 68, the position of the bulldozer 2 is detected by cinematic survey. The first GPS receiver 80, the second GPS receiver 68 and the control unit 52 constitute a surveying system, and the radio transmitter/receiver 72, the second GPS receiver 68, and the radio receiver 51 constitute a data communication system.

In the following, description will be given on operation.

The second GPS receiver 68 is installed at a known point, and the rotary laser irradiating apparatus 1 is installed at a known point.

After the installation, leveling of the rotary laser irradiating apparatus 1 is performed at first. Leveling operation is performed by tilt adjustment using the tilting mechanism 16. When leveling operation is completed, a direction of the rotary laser irradiating apparatus 1 is aligned with the level sensor 7, and initialization is performed. At first, a tilting direction of the rotary laser irradiating apparatus 1 does not agree with the setting of the control unit 52, and initialization is required. Positions of the bulldozers 2a, 2b and 2c are calculated by the first GPS receivers 80a, 80b and 80c and the second GPS receiver 68, and initialization is performed by turning the rotary laser irradiating apparatus 1 installed at a known point toward the level sensor 7 of one of the bulldozers 2a, 2b and 2c. In case initialization is performed manually, the collimator 15 is collimated, and the rotary laser irradiating apparatus 1 is rotated. Further, by operating the tilting mechanism 16, an irradiating direction of the rotary laser irradiating apparatus 1 is determined.

The same result is obtained when initialization is performed with a different reference point.

The information received by the receiver 51 and a signal received by the second GPS receiver 68 are inputted every moment to the control unit 52. On the control unit 52, positions of the bulldozers 2a, 2b and 2c are surveyed. The results of the survey include plane position information of the bulldozers 2a, 2b and 2c, and the control unit 52 calculates a gradient of the laser beam 4 for each of the bulldozers 2a, 2b and 2c based on the plane position information and on the working data preset in the storage unit 66 by the arithmetic unit 65.

The calculation result is inputted to the control unit 14 of the rotary laser irradiating apparatus 1. The control unit 14 drives and controls the scanning means 29 based on the detection of the irradiating direction by the encoder so that the reference plane (reference line) formed by the laser beam 4 will be the calculated gradient in working areas of the bulldozers 2a, 2b and 2c. For example, if the working area of the bulldozer 2a is on the reference plane formed by rotary irradiation of the laser beam 4, the scanning means 29 is driven by a signal from the control unit 14 for the bulldozer 2c, and the laser beam 4 is deflected downward. Then, the scanning level is moved downward. For the bulldozer 2b, the irradiating direction of the laser beam 4 is deflected upward by the scanning means 29 for the bulldozer 2b, and the scanning level is moved upward.

As described above, a response speed of the scanning means 29 is higher enough than the rotating speed of the laser beam 4, and the scanning level can be changed by limiting it to the working areas of the bulldozers 2a, 2b and 2c, and a tilting direction and a gradient of the laser beam 4 can be set to each of the bulldozers 2a, 2b and 2c. When the setting of the tilting direction and the gradient is completed, positioning of the blade 5 is performed.

In the above, description has been given on the scanning means, which uses an acousto-optic element having higher response rate. In case scanning means with slower response rate is used, the number of the controllable construction machines is decreased. In this case, if on-off control of the laser beam is simultaneously used and the scanning levels of construction machines are identified, as many construction machines as required can be controlled by several turns of rotation. If 3 machines can be controlled by one turn, 9 machines can be controlled by 3 turns of rotation. Or, it may be designed in such manner that one construction machine is controlled for each turn, and by as many turns of rotation as the number of the machines to be controlled, a series of control operation can be performed.

For each of the bulldozers 2a, 2b and 2c, the arithmetic unit 73 calculates a photodetection position on the level sensor 7 according to a photodetection signal from the level sensor 7. The photodetecting position and the reference position are comparatively calculated, and if there is deviation, a drive control signal is issued to the electric/hydraulic circuit 74 so that the deviation will be corrected. The electric/hydraulic circuit 74 drives the hydraulic cylinder 75 and moves the blade 5 up or down. Because the level sensor 7 is moved up or down integrally with the blade 5, the amount of upward or downward movement of the blade 5 agrees with that of the level sensor 7, and when the photodetecting position on the level sensor 7 agrees with the reference position, the position of the blade 5 is determined.

Each of the bulldozers 2a, 2b and 2c is moved, and ground leveling operation can be performed at many points at the same time. The position of each of the bulldozers 2a, 2b and 2c is calculated by the control unit 52 as the data received by the first GPS receiver 80 is transmitted to the radio receiver 51 by the transmitter 81 and the received data from the second GPS receiver 68 is inputted to the control unit 52 and calculated by the control unit 52. Further, the position of the bulldozer 2 is calculated at real time.

The height and the tilting of the leveled ground surface at each of the positions of the bulldozers 2a, 2b and 2c are calculated according to the working data. If the leveled ground surface is an inclined surface with a certain gradient, the gradient of the reference plane formed by the rotary laser irradiating apparatus 1 is not changed. If it is a curved surface, the ground surface can be leveled without changing the gradient of the reference plane of the laser beam as the bulldozer 2 is moved.

By the use of the present system, it is possible to automatically perform ground leveling in accordance with the working data. Operation may be manually performed in ground leveling operation by operators based on the data displayed on the display unit 76.

In the embodiment described above, the level sensor is arranged on the blade 5. However, if it is designed in such manner that position of the blade edge 5' is detected from the expanding or shrinking condition of the hydraulic cylinder 75 or from the position of an arm to support the blade 5, the level sensor 7 may be disposed on the car body of the bulldozer 2. Also, description is given above on a GPS system of cinematic type, while any type of GPS system may be used so far as it can immediately detect a moving point. Further, the range of the level sensor 7 may be reciprocally scanned according to the output of the encoder 28, which detects a rotating position of the rotator 12, or the laser beam may be rotated by limiting emission of the laser beam only to the range of the level sensor 7.

As described above, according to the rotary laser irradiating apparatus of the present invention, a vertical irradiating direction can be changed at high rate, and the level can be set within a plurality of ranges limited in one turn of rotation, and civil engineering or construction work can be performed at many points at the same time using a single rotary laser irradiating apparatus. Also, according to the construction machine control system of the present invention, when ground leveling operation is performed according to a reference plane formed by the laser beam, the ground leveling operation to prepare not only horizontal surface but also inclined surface or curved surface can be performed in easy and reliable manner by operators with no special experience and skill, and the working time can be reduced. Different types of ground leveling operation can be performed by several construction machines at the same time. Because level setting for each of the construction machines is performed by the same rotary laser irradiating apparatus, erroneous operation of construction machines can be eliminated.

What is claimed is:

1. A construction machine control system, comprising a construction machine, a rotary laser irradiating apparatus for changeably forming a laser reference plane for position control of a ground leveling equipment of said construction machine having a controllable position, a GPS receiver for detecting a position of said construction machine, an equipment control means arranged on said construction machine and used for detecting the laser reference plane for controlling the position of said ground leveling equipment, and an arithmetic unit for controlling said rotary laser irradiating apparatus in such manner that a laser reference plane corresponding to the position of said construction machine is formed based on detection result of said GPS receiver, and said system controls ground leveling operation of the construction machine.

2. A construction machine control system according to claim 1, wherein said GPS receiver is provided on said construction machine, and said system further comprises transmitting means for transmitting a result of receiving from said GPS receiver, said rotary laser irradiating apparatus for forming said laser reference plane corresponding to the position of said construction machine during one rotation, a level sensor provided on said construction machine and for detecting said laser reference plane, said equipment control means controlling the position of said ground leveling equipment based on the detection result of said level sensor, receiving means for receiving transmission from said transmitting means, and said arithmetic unit comprises a storage unit in which data are stored, for calculating a position of said construction machine based on information obtained from said receiving means, and controlling a laser beam irradiating direction from said rotary laser irradiating apparatus based on information stored in said storage unit.

3. A construction machine control system according to claim 1, wherein said GPS receiver is provided on said construction machine, and said system further comprises transmitting means for transmitting a result of receiving from said GPS receiver, said rotary laser irradiating apparatus for forming said laser reference plane corresponding to the position of said construction machine by using a plurality of laser rotations by on-off control of said laser beam, a level sensor provided on said construction machine and for detecting said laser reference plane, said equipment control means controlling the position of said ground leveling equipment based on the detection result of said level sensor, receiving means for receiving transmission from said transmitting means, and said arithmetic unit comprises a storage unit in which working data are stored, for calculating a position of said construction machine based on information obtained from said receiving means, and controlling a laser beam irradiating direction from said rotary laser irradiating apparatus according to information stored in said storage unit.

4. A construction machine control system according to claim 1, wherein said GPS receiver comprises a first GPS receiver and a second GPS receiver, said first GPS receiver is provided on said construction machine and the second GPS receiver is positioned at a known point.

5. A construction machine control system according to claim 1, wherein there is a plurality of construction machines.

6. A construction machine control system according to claim 2, wherein there is a plurality of construction machines.

7. A construction machine control system according to claim 3, wherein there is a plurality of construction machines.

8. A construction machine control system according to claim 4, wherein there is a plurality of construction machines.

* * * * *